(12) United States Patent
Brandon et al.

(10) Patent No.: US 7,751,720 B2
(45) Date of Patent: Jul. 6, 2010

(54) SYSTEM AND METHOD FOR AUTOMATIC TUNING OF CHROMATIC DISPERSION COMPENSATION FOR A WDM TRANSMISSION SYSTEM USING RAMAN DISTRIBUTED CO-PUMPING

(75) Inventors: Eric Brandon, Paris (FR); Laurent Labrunie, Paris (FR); Philippe Bousselet, Leudeville (FR)

(73) Assignee: Alcatel Lucent, Paris (FR)

( * ) Notice: Subject to any disclaimer, the term of this patent is extended or adjusted under 35 U.S.C. 154(b) by 788 days.

(21) Appl. No.: 11/612,680

(22) Filed: Dec. 19, 2006

(65) Prior Publication Data

US 2007/0237526 A1  Oct. 11, 2007

(30) Foreign Application Priority Data

Dec. 20, 2005  (EP)  ................................. 05301084

(51) Int. Cl.
*H04B 10/00* (2006.01)
(52) U.S. Cl. .................... 398/157; 398/180; 359/341.3; 359/337.5
(58) Field of Classification Search .................. 398/147, 398/157–158, 180; 359/3–341.33; 350/3–341.33
See application file for complete search history.

(56) References Cited

U.S. PATENT DOCUMENTS

| | | | |
|---|---|---|---|
| 6,657,774 B1 * | 12/2003 | Evans et al. .................. | 359/334 |
| 2002/0159131 A1 | 10/2002 | Bartolini | |
| 2004/0091205 A1 | 5/2004 | Denkin | |
| 2004/0156038 A1 | 8/2004 | Cao | |
| 2005/0041977 A1 * | 2/2005 | Denkin et al. .................. | 398/94 |

OTHER PUBLICATIONS

Emori et al, "Broadband lossless DCF using Raman amplification pumped by multichannel WDM laser diodes", Electronics Letters, IEE Stevenage, GB, vol. 34, No. 22, Oct. 29, 1998, pp. 2145-2146, XP006010543.

* cited by examiner

*Primary Examiner*—Leslie Pascal
(74) *Attorney, Agent, or Firm*—Carmen Patti Law Group, LLC

(57) ABSTRACT

System and method for dispersion compensation tuning for a WDM optical transmission system. A tunable dispersion compensation module (4) is located at or substantially close to a transmitting end of the optical transmission line (2) and at least one distributed Raman amplifier having an Raman pump (1) is coupled to the transmission line 2. The dispersion compensation is controlled by means of a signal derived from the Raman pump (1) which is fed through a control loop (3) to the tunable dispersion compensation module (4).

16 Claims, 3 Drawing Sheets

SYSTEM AND METHOD FOR AUTOMATIC TUNING OF CHROMATIC DISPERSION COMPENSATION FOR A WDM TRANSMISSION SYSTEM USING RAMAN DISTRIBUTED CO-PUMPING

This application is based on and claims the benefit of European Patent Application No. 05301084.9 filed Dec. 20, 2005, which is incorporated by reference herein.

The present invention relates to system performance in WDM transmission systems. More particularly, the invention is related to automatic tuning of chromatic dispersion compensation where Raman distributed systems preferably with co-pumping, are used.

BACKGROUND OF THE INVENTION

Wavelength Division Multiplexing (WDM) is a widely used technique for transmission of optical signals through optical fibers in optical communication systems. Basically, in a WDM transmission system, a plurality of wavelengths of optical signals (or channels) are transported simultaneously over one fiber without interaction.

One problem associated with the use of WDM is the so-called chromatic dispersion. This problems arises because, in general terms, each wavelength component of a signal travels through the optical fiber at a slightly different speed, resulting in the broadening of the pulse at the arrival point. It is desired that the impact of chromatic dispersion is maintained, as much as possible, at a minimum level.

Therefore it may be argued that the performance of the WDM transmission systems is highly dependent on the impact of chromatic dispersion produced on the transmission line. In particular, it turns out that when relatively high channel bit rates, such as 10 Gb/s or larger are used, more sever impacts of the chromatic dispersion are produced.

In this regard, the impact of the chromatic dispersion mapping on the non-linear threshold, as well as the transmitter/receiver tolerance to the cumulated chromatic dispersion are of concern. Non-linear threshold is a pre-determined level of optical signal power beyond which nonlinear optical effects occur in optical fibers which may impact the signal transmission performance.

At present, specific dispersion mappings are used for systems already deployed in order to minimize the performance impairments. These mappings usually depend on the type of the optical fiber (examples of such fiber types are the known standard compliant G.652 or G.655) used in the transmission line, as well as on the characteristics of the transmitter/receiver interfaces. Example of such interface dependent characteristics are the chirp of the modulator or the performance of electrical regeneration.

A widely used approach is the compensation of the chromatic dispersion of the line fiber by means of spools of fiber having the opposite dispersion characteristics. The effect of opposite dispersion in this case is used for the desired compensation. Compensating spools of fiber may be located at the output of the transmitters (pre-compensation), in an intermediate point of the transmission line (in-line compensation) or at the input of the receivers (post-compensation).

FIG. 1, schematically shows a WDM transmission system 100 using the compensating spools solution. As shown in the figure, transmitters 101 coupled to a multiplexer 102 are shown at the transmission side and receivers 109 coupled to a de-multiplexer 108 are shown at the receiving side. The optical transmission line is represented by reference numerals 104 and 106. The optical signal generated at the transmission side is output from the multiplexer 102 and is fed into an optical amplifier 103. The optical amplifier 103 is coupled to a spool of fiber 103a which has partly opposite dispersion characteristics as compared to those of the optical transmission line 104, therefore partial dispersion compensation is provided by the spool of fiber 103a. As this dispersion compensation is provided at the starting point of the transmission, it is usually referred to as pre-compensation. A similar dispersion compensation is provided in one or more intermediate points of the transmission system, generally referred to as in-line compensation. This is represented in the figure by the optical amplifier 105 and the spool fiber 105a which has dispersion characteristics opposite to those of the transmission line fiber 104. Finally, another similar compensation is provided at the reception point of the transmission line. This is represented by the optical amplifier 107 and the spool of fiber 107a. This compensation is referred to as post-compensation.

A large part of the system performance is dominated by the amount of pre-compensation, in-line compensation and post-compensation. In order to reach optimal performances, this amount must be adjusted depending on the fiber characteristics, the transmitter/receiver characteristics and the channel power levels.

In certain solutions use is made of a tunable device placed at the input of the optical receiver in order to finely adjust the cumulated dispersion, thus reducing the need for a perfect in-line compensation. Such device is generally called Tunable Dispersion Compensating Module (TDCM) and may be used in order to optimize the Bit Error Ratio (BER) of the system, either manually or automatically when Forward Error Correction (FEC) is implemented. It is to be noted that optical compensation can be replaced or enhanced with electrical compensation within the receiver (e.g. adaptive receiver).

The above solution provides satisfactory results in eliminating the difference of cumulated dispersion between two channels having different wavelengths. In particular, it contributes to reducing the need for a perfect in-line compensation, which is very difficult or in cases even impossible for some fiber types, especially for G.653 or G.655 types.

The above solution also provides certain improvement in compensation when a change occurs in the level of the signal within the system; for example after adding or dropping of channels or when the power of an amplifier is changed. However, the above solution is not suitable for the case of Raman distributed systems with co-pumping. Raman distributed co-pumping is a widely used technique in order to increase the power of an incoming optical signal. A high-power optical beam is pumped into the transmission fiber in the same direction of propagation as that of the optical signal whereby the signal is amplified as a result of interactions between the fiber material and the pump photons.

In systems using Raman distributed co-pumping, the channel power depends on the Raman gain, therefore the dispersion mapping should be modified when the Raman gain is changed.

It is therefore desired to provide a solution for automatic tuning of chromatic dispersion compensation for a WDM transmission system when Raman pumping is used such that the drawbacks or difficulties of the known solutions as mentioned above are overcome.

DESCRIPTION OF THE INVENTION

The above objective is reached by using the solution proposed by the present invention according to which the amount of pre-compensation is adjusted depending on the Raman gain.

Preferably the solution of the invention is implemented in systems where Raman distributed co-pumping is used. However, the invention may be equally applicable where Raman counter-pumping is used over short spans for which a typical application is in very long-haul terrestrial or submarine repeatered applications. In such cases, as the spans are short, the Raman pumping may also increase the signal power up to levels close to the non-linear effect limit.

Accordingly one object of the present invention is that of providing a dispersion compensation tuning arrangement for an optical transmission system having an optical transmission line, the arrangement comprising a tunable dispersion compensation module and at least one distributed Raman amplifier comprising a Raman pump being coupled to the transmission line, characterized in that the tunable dispersion compensation module is located at or substantially close to a transmitting end of the optical transmission line and in that a response of said tunable dispersion compensation module is controlled by means of a signal derived from the Raman pump.

Another object of the present invention is that of providing an optical transmission system comprising a dispersion compensation arrangement of the invention.

A further object of the present invention is that of providing a method of tuning dispersion compensation for an optical transmission system having an optical transmission line, comprising a tunable dispersion compensation module and at least one distributed Raman amplifier comprising a Raman pump coupled to the transmission line, characterized by the steps of locating the tunable dispersion compensation module at or substantially close to a transmitting end of the optical transmission line, and controlling a response of said tunable dispersion compensation module by means of a signal derived from the Raman pump.

These and further advantages of the present invention are explained in more detail in the following description as well as in the claims with the aid of the accompanying drawings.

EXAMPLES OF PREFERRED EMBODIMENTS

In Raman distributed systems with co-pumping (also in certain cases using counter-pumping as mentioned above), one of the most important parameters in order to obtain optimal performance is the amount of pre-compensation performed.

However, for the sake of simplification of the description, the following discussion is provided with respect to Raman co-pumping applications while it is to be understood that the invention is not to be construed as being limited to co-pumping applications only.

Figure 1:
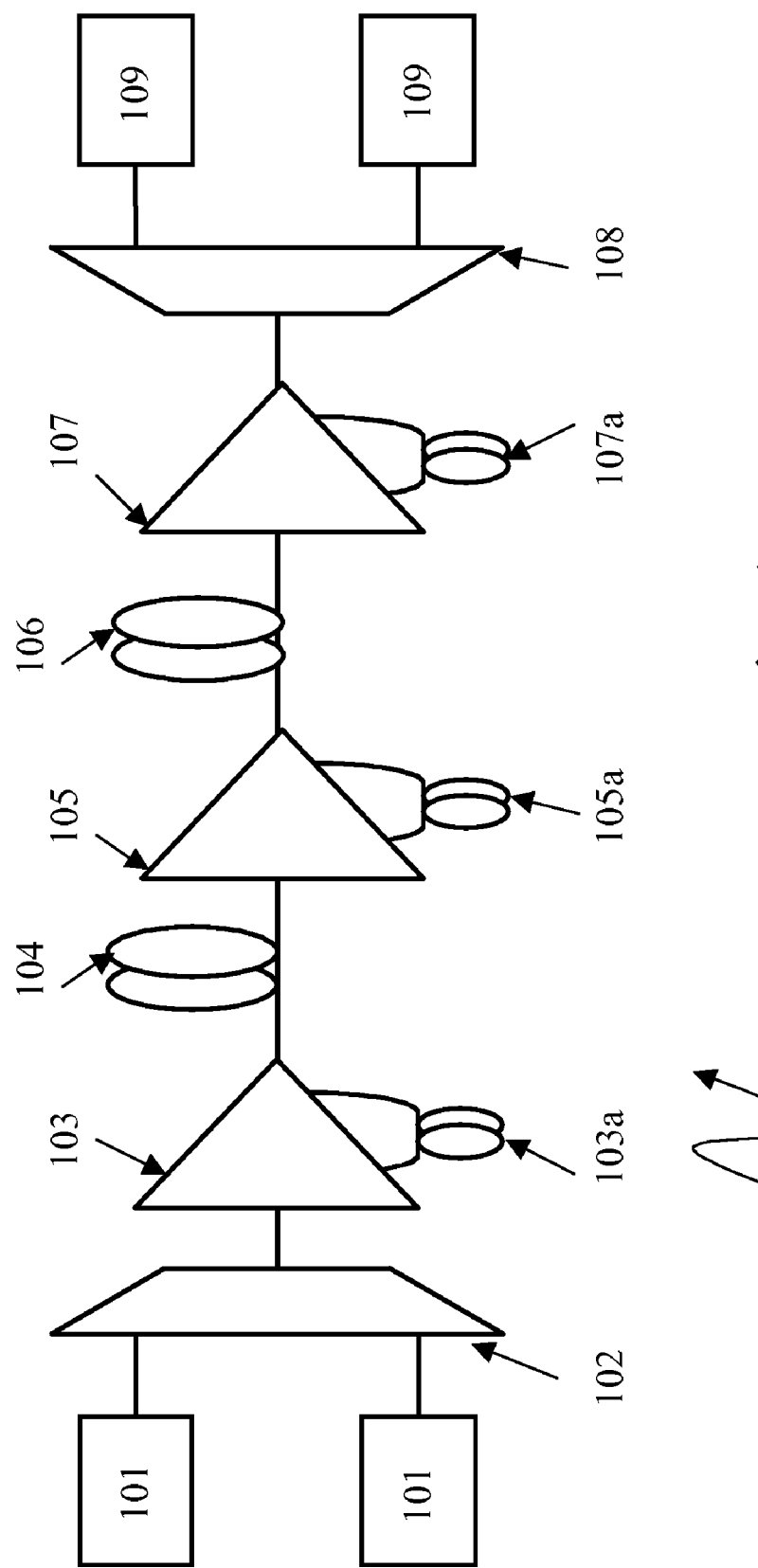
FIG. 1 is a schematic block diagram representation of a WDM transmission system using the compensating spools solutions in accordance with conventional solutions.
Figure 2:
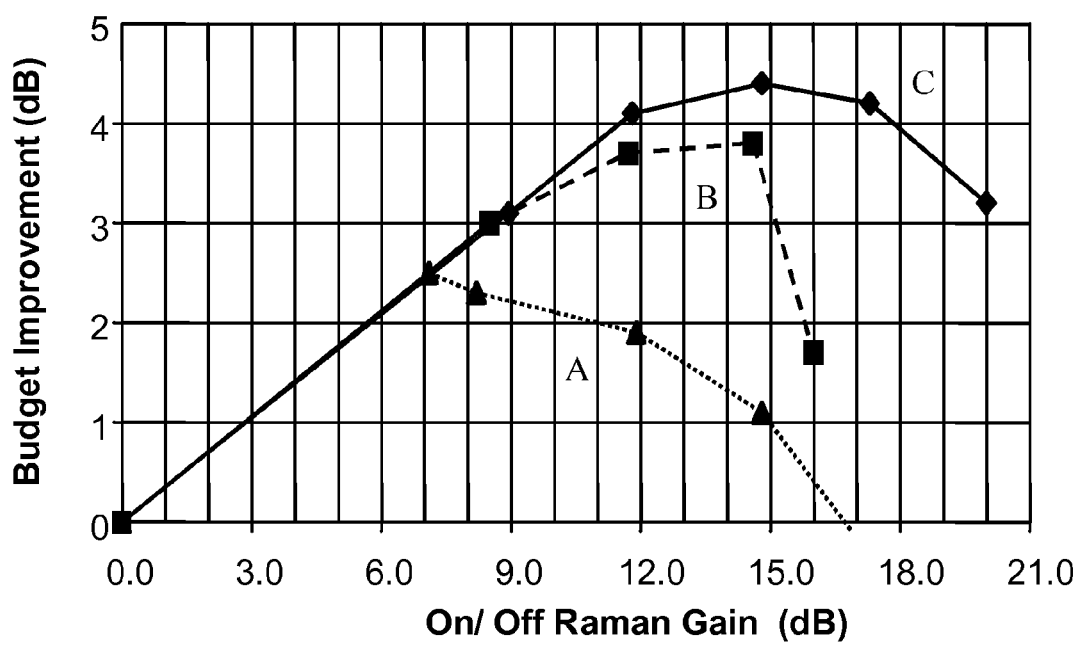
FIG. 2 is a graph representation of experimental results showing performance improvement obtained by using various levels of pre-compensation in a Raman distributed co-pumping configuration.

FIG. 2 shows an experimental graph of performance improvement obtained by Raman distributed co-pumping versus the on/off Raman gain for a single span system at 10 Gb/s over a single mode fiber (SMF).

In FIG. 2, the X axis represents Raman gain in dB and the Y axis represents the budget improvement—also in dB—with respect to a configuration without Raman co-pumping. The dotted line A (shown for comparison purposes) corresponds to an experimental result where Raman co-pumping is used but pre-compensation is absent. It is to be noted that for single-span systems without using Raman co-pumping the performance of the system is usually optimal when there is no pre-compensation.

The broken line B corresponds to a −1023 ps/nm pre-compensation level and the solid line C represents a performance obtained by −505 ps/nm pre-compensation level with Raman co-pumping present in both cases.

As the above is the representation of experimental result, for a better understanding thereof, it is noted that lines A, B and C represent optimal results in each case in the sense that, the Raman gain and the pre-compensation being fixed for each measurement point, the signal power is adjusted to get the best performance.

Therefore, it is clearly seen in this figure that the pre-compensation level corresponding to line C represents the best performance improvement when Raman co-pumping is present. Comparison between lines B and C further shows that, other conditions being equal, it is in fact the amount of pre-compensation employed which has an important impact on the system performance.

Based on the above arguments, the solution proposed by the present invention aims in general terms, at controlling the level of pre-compensation on the optical signal when Raman co-pumping is used. This is done with due regard to the fact that in systems using Raman distributed co-pumping, the channel power depends on the Raman gain, therefore the dispersion mapping should be modified when the Raman gain is changed.

In particular, the invention proposes the use of a TDCM at a pre-compensation stage and to control its response in dependence on the Raman gain in order to set a pre-compensation value that depends on the on/off Raman gain, and hence on the Raman pump power.

Figure 3:
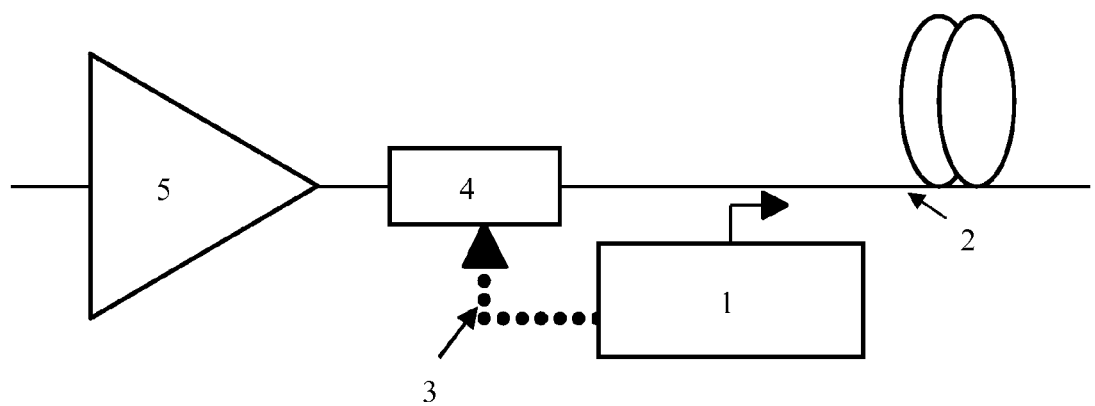
FIG. 3 is a graph schematic block diagram representation of a dispersion compensation co-pumping system according to the present invention.
Figure 4:
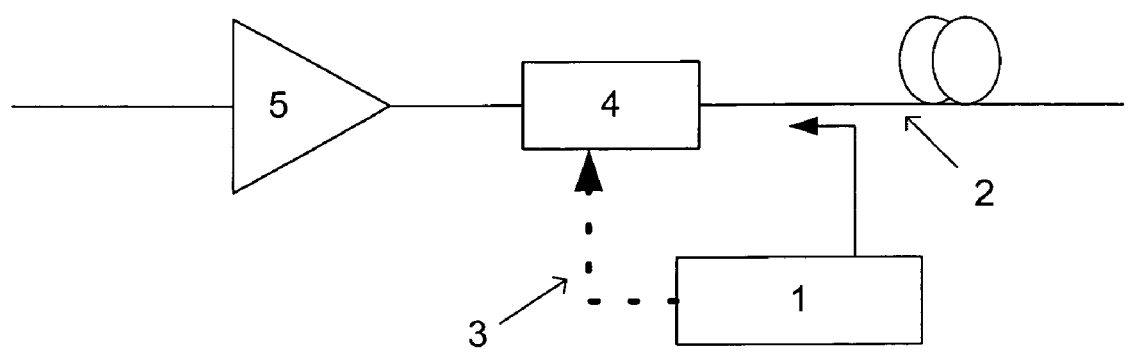
FIG. 4 is a graph schematic block diagram representation of a dispersion compensation counter-pumping system according to the present invention.

FIG. 3 shows a schematic block diagram representation of a dispersion compensation arrangement with Raman co-pumping based on the principles of the present invention. A Raman pump 1 is coupled to an optical transmission line 2 and is adapted for co-pumping optical signal power into the optical transmission line 2. The Raman pump 1 is further coupled, through a control loop 3 to a TDCM 4. The TDCM 4 is located at or close to the transmitting end (the latter not shown in the figure) of the optical transmission line and is in charge of performing tuned pre-compensation on the optical signal to be transmitted.

The tuning of the TDCM 4 is controlled by an input signal received from the Raman pump 1 through the control loop 3 which is disposed in a feed-back configuration between the TDCM 4 and the Raman pump 1. The signal received by the TDCM 4 from the Raman pump 1 is indicative of the signal power generated by the Raman pump and coupled to the optical transmission line 2.

In this manner the level of the pre-compensation provided by the TDCM 4 is controlled, or tuned, by the level of signal power produced the Raman pump 1 which is fed back to the TDCM through the control loop 3. The higher the pump power, the higher the Raman gain and thus the higher the signal power. The signal power level is thus detected by the TDCM 4 and the pre-compensation to be performed by the latter is set in accordance with the detected power level. In normal conditions, e.g. the system working below non-linear threshold, the higher the Raman gain, the higher pre-compensation is required. This can be seen in FIG. 2. For example, for 7 dB gain, the same performance is obtained no matter what pre-compensation amount is performed, for such a case 0 ps/nm is convenient. However, for 15 dB gain it is required to increase the pre-compensation amount up to −500 ps/nm (represented by line C). A too much of an increase is made on the amount of pre-compensation then the performance degrades (represented by line B). For systems working close to the non-linear limit, the TDCM setting is less predictable. For such systems a control loop is advised in order to control the level of compensation.

It is to be noted that for relatively large signal power levels such as such s for example 15 dBm per channel, the TDCM must be adjusted to a value different from a corresponding value for small signal power levels such as for example 0 dBm per channel. In FIG. 3, an optical amplifier 5 is shown upstream of the TDCM 4. The optical amplifier 5, as is known, is in charge of amplifying the optical signal before pre-compensation at the TDCM 4. An example of such optical amplifier is an erbium doped amplifier. However, the use of the optical amplifier 5 is optional.

Due to the fact that in Raman co-pumping the signal power is amplified in the line fiber, it may not be easy to measure the actual power level of the signal which may complicate the control of the pre-compensation level at the TDCM 4 (in such cases a control loop based on FEC information is advised). However, based on known values such as the output power level of the optical amplifier, the power level of the Raman pump and the line fiber characteristics, it is possible to calculate the so-called "integrated signal power", i.e. the total signal power level present on the transmission line, which is a relevant parameter for the system performance. This value may be validly used for controlling the TDCM response.

Thus based on the solution proposed by the present invention, the pre-compensation level may first be set at a given value and then this value may be dynamically controlled in order to avoid performance degradation over the system life. Advantageously, such dynamic control may make it possible to overcome, or reduce the influence of, any fluctuation in the pump power caused by the ageing of the pump in the Raman pump assembly, or similarly in the ageing of the optional erbium doped amplifier 5.

The dynamic setting of the pre-compensation level may also allow the ability to react in case a change in signal power occurs. Such change may occur, for instance, after a modification of the system load due to protection, or due to an upgrade in channel count or due to traffic routing.

The setting point of the pre-compensation level may be chosen according to pre-established criteria or by other means such as for example, by searching into a look-up table having pre-defined values where the TDCM setting value is a function of pump power.

The invention claimed is:

1. A dispersion compensation tuning arrangement for an optical transmission system comprising WDM configuration and having an optical transmission line (2), the arrangement comprising a tunable dispersion compensation module (4) and at least one distributed Raman amplifier comprising a Raman pump (1) being coupled to the transmission line (2), characterized in that the tunable dispersion compensation module (4) is located at or substantially close to a transmitting end of the optical transmission line (2) and the Raman pump (1) is operatively coupled with the tunable dispersion compensation module (4) via a control loop (3) wherein the Raman pump (1) communicates a control signal to the tunable dispersion compensation module (4) to adjust a response of the tunable dispersion compensation module (4).

2. A dispersion compensation tuning arrangement according to claim 1, wherein said control signal communicated from the Raman pump is indicative of a signal power of a signal generated by the Raman pump.

3. A dispersion compensation tuning arrangement according to claim 1 wherein said control loop (3) is disposed in a feed-back configuration between the tunable dispersion compensation module (4) and the Raman pump (1) and wherein the Raman pump (1) controls a dispersion mapping of the tunable dispersion compensation module (4).

4. A dispersion compensation tuning arrangement according to claim 1, wherein the Raman pump (1) is disposed in co-pumping configuration with respect to the optical transmission line (2).

5. A dispersion compensation tuning arrangement according to claim 1, wherein the Raman pump (1) is disposed in counter-pumping configuration with respect to the optical transmission line (2).

6. A dispersion compensation tuning arrangement according to claim 1 wherein an optical amplifier (5) is disposed upstream of the tunable dispersion compensation module (4).

7. An optical transmission system comprising a dispersion compensation arrangement according to claim 1.

8. Method of tuning dispersion compensation for an optical transmission system comprising WDM configuration and having an optical transmission line (2), comprising a tunable dispersion compensation module (4) and at least one distributed Raman amplifier comprising a Raman pump (1) coupled to the transmission line (2), characterized by the steps of locating the tunable dispersion compensation module (4) at or substantially close to a transmitting end of the optical transmission line (2), and the Raman pump (1) is operatively coupled with the tunable dispersion compensation module (4) via a control loop (3) wherein the Raman pump (1) communicates a control signal to the tunable dispersion compensation module (4) to adjust a response of the tunable dispersion compensation module (4).

9. The method of claim 8, wherein said control signal communicated from the Raman pump is indicative of a signal power of a signal generated by the Raman pump.

10. Method of tuning dispersion compensation according to claim 8, wherein said control loop (3) is disposed in a feed-back configuration between the tunable dispersion compensation module (4) and the Raman pump (1) and wherein the Raman pump (1) controls a dispersion mapping of the tunable dispersion compensation module (4).

11. Method of tuning dispersion compensation according to claim 8, wherein the Raman pump (1) performs co-pumping of optical signal with respect to the optical transmission line (2).

12. Method of tuning dispersion compensation according to claim 8, wherein the Raman pump (1) performs counter-pumping of optical signal with respect to the optical transmission line (2).

13. Method of tuning dispersion compensation according to claim 8, wherein the controlling of the response of the tunable dispersion compensation module is used to overcome fluctuation in the power of the Raman pump (1).

14. Method of tuning dispersion compensation according to claim 8, wherein the controlling of the response of the tunable dispersion compensation module is used to overcome an effect of change in signal power.

15. Method of tuning dispersion compensation according to claim 8, wherein a setting point of the dispersion compensation level is chosen according to pre-established criteria.

16. Method of tuning dispersion compensation according to claim 15 wherein the setting point of the dispersion compensation level is chosen from a pre-defined look-up table.

* * * * *